(12) United States Patent
Takikawa et al.

(10) Patent No.: US 11,862,210 B2
(45) Date of Patent: Jan. 2, 2024

(54) DISK DRIVE SUSPENSION INCLUDING A WELD PORTION SECURING A LOAD BEAM AND FLEXURE AND SUPPORTING A ROOT OF A FLEXURE OUTRIGGER

(71) Applicant: NHK SPRING CO., LTD., Yokohama (JP)

(72) Inventors: Kenichi Takikawa, Yokohama (JP); Toshiki Ando, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/180,781

(22) Filed: Mar. 8, 2023

(65) Prior Publication Data

US 2023/0290373 A1    Sep. 14, 2023

(30) Foreign Application Priority Data

Mar. 10, 2022 (JP) ................. 2022-037205

(51) Int. Cl.
   *G11B 5/48* (2006.01)

(52) U.S. Cl.
   CPC .......... *G11B 5/4833* (2013.01); *G11B 5/4826* (2013.01)

(58) Field of Classification Search
   CPC .................... G11B 5/4833; G11B 5/4826
   See application file for complete search history.

(56) References Cited

U.S. PATENT DOCUMENTS

| | | | | |
|---|---|---|---|---|
| 5,568,332 A * | 10/1996 | Khan | ............. | G11B 5/4826 |
| 5,748,409 A | 5/1998 | Girard et al. | | |
| 6,181,526 B1 * | 1/2001 | Summers | ............. | G11B 5/4853 |
| | | | | 360/245.9 |
| 7,518,829 B1 * | 4/2009 | Drape | .............. | G11B 5/4833 |
| | | | | 360/244.2 |
| 9,076,469 B1 * | 7/2015 | Kuwajima | ............. | G11B 5/48 |
| 9,093,089 B1 * | 7/2015 | Aoki | ............. | G11B 5/48 |
| 10,748,565 B1 * | 8/2020 | Nakayama | ............. | G11B 5/486 |
| 2003/0086207 A1 | 5/2003 | Watadani et al. | | |
| 2013/0098885 A1 * | 4/2013 | Takei | ............. | G01B 5/24 |
| | | | | 219/121.64 |
| 2014/0022671 A1 * | 1/2014 | Takikawa | ............. | G11B 5/4826 |
| | | | | 360/234.6 |
| 2014/0268427 A1 | 9/2014 | Hogan et al. | | |
| 2016/0351215 A1 * | 12/2016 | Tanaka | ............. | G11B 5/4826 |
| 2020/0279579 A1 * | 9/2020 | Nakayama | ............. | G11B 5/4833 |
| 2021/0151073 A1 * | 5/2021 | Yamada | ............. | G11B 5/4833 |

(Continued)

FOREIGN PATENT DOCUMENTS

JP        2021190151 A    12/2021

*Primary Examiner* — Brian E Miller
(74) *Attorney, Agent, or Firm* — Holtz, Holtz & Volek PC

(57) ABSTRACT

A sag bend portion is formed in a longitudinal part of the load beam and bent in a thickness direction. The load beam includes a first portion and a second portion bordering the sag bend portion. Roots of outrigger portions are secured to the load beam by weld portions. A slit portion is formed around each of the weld portions. The slit portion includes an arc-shaped slit and a pair of extension slits. An outrigger support portion is formed inside the slit portion. The outrigger support portion extends in a direction different from that of the second portion of the load beam with respect to a cross section along the longitudinal direction of the load beam in the thickness direction.

10 Claims, 9 Drawing Sheets

(56) References Cited

U.S. PATENT DOCUMENTS

| | | | |
|---|---|---|---|
| 2021/0241802 A1* | 8/2021 | Nakayama | G11B 25/043 |
| 2021/0287698 A1* | 9/2021 | Yamada | G11B 5/4833 |
| 2021/0383829 A1 | 12/2021 | Kurebayashi et al. | |
| 2022/0013150 A1* | 1/2022 | Nakayama | G11B 33/022 |
| 2022/0157337 A1* | 5/2022 | Aoki | G11B 5/4833 |
| 2023/0117866 A1* | 4/2023 | Nishida | G11B 33/02 29/603.03 |
| 2023/0123177 A1* | 4/2023 | Senda | G11B 5/4833 360/244.2 |
| 2023/0197110 A1* | 6/2023 | Nakayama | G11B 5/4826 360/245.2 |

* cited by examiner

DISK DRIVE SUSPENSION INCLUDING A WELD PORTION SECURING A LOAD BEAM AND FLEXURE AND SUPPORTING A ROOT OF A FLEXURE OUTRIGGER

CROSS-REFERENCE TO RELATED APPLICATIONS

This application is based upon and claims the benefit of priority from prior Japanese Patent Application No. 2022-037205, filed Mar. 10, 2022, the entire contents of which are incorporated herein by reference.

BACKGROUND OF THE INVENTION

1. Field of the Invention

The present invention relates to a disk drive suspension including a load beam and a flexure, and more specifically, a suspension in which the load beam and the flexure are fixed by a weld portion.

2. Description of the Related Art

Disk drives are used in information processing devices such as a personal computer. The disk drive includes a magnetic disk which rotates about a spindle and a carriage spinning about a pivot axis. A disk drive suspension is provided on an arm of the carriage.

The disk drive suspension (to be referred to as a suspension hereinafter) includes, for example, a base plate, a load beam and a flexure arranged along the load beam. A slider is provided with a gimbal portion formed in the proximity of the distal end of the flexure. In the slider, an element configured to perform access to a disk to read/write data from/to the disk is provided. Examples of the conventional suspension are disclosed in US 2003/0086207 A (Patent Literature 1), and US 2014/0268427 A (Patent Literature 2).

The load beam is formed of a metal plate such as stainless steel. One example of the flexure includes a metal base and a wiring portion formed along the metal base. The metal base is made from a metal plate such as of stainless steel, which is thinner than the load beam. On respective sides of the gimbal portion, outrigger portions are formed.

The outrigger portions are formed from parts of the metal base and elastically support the gimbal portion. The metal base is secured to the load beam by a weld portion such as of laser spot welding. Depending on the specifications of the suspension, the weld portions may be formed in the vicinity of the proximal portion of the outrigger portion.

An example of the suspension is described in JP 2021-190151 A (Patent Literature 3). The suspension has a bend portion in a longitudinal middle of the load beam (between the proximal portion and the distal end portion), depending on the specifications. The bend portion is bent at a small angle in the thickness direction of the load beam. In the field of this technique, this bend is referred to as a sag bend portion.

The sag bend portion is formed by bending a longitudinal part of the load beam in the thickness direction of the load beam by a die. The load beam with the sag bend portion includes a first portion and a second portion bounded by the sag bend portion. The first portion is located on a side closer to the proximal portion of the load beam with respect to the sag bend portion. The second portion is located on a side closer to the distal end portion of the load beam with respect to the sag bend portion.

As the rotational speed of disks increases, and further, the density and precision of disks increase, it is becoming more important to control the vibration modes near the gimbal portion. In order to suppress the vibration modes of the gimbal portion, it is necessary to properly control the profile of the outrigger portions.

The expression "profile of the outrigger portion" used in this specification refers to the shape of the outrigger portions when the load beam is viewed from a side surface direction, the angle of the outrigger portions to the load beam and the like. If the profile of the outrigger portions is not properly maintained, some adverse effect may occur in vibration control of the gimbal portions.

The metal base (also referred to as a metal plate) of the flexure is secured to the load beam by a plurality of weld portions. The weld portions are usually formed by laser spot welding, for example. In some suspensions, some of the weld portions are formed near the roots of the outrigger portions. In some cases, the weld portions are formed near the sag bend portion.

The weld portions for supporting the vicinity of the roots of the outrigger portions may be located near the sag bend portion. In such cases, the profile of the outrigger portions may be affected by the sag bend portion. The second portion bends in the thickness direction of the load beam with respect to the first portion, at the border of the sag bend portion. Therefore, the vicinity of the roots of the outrigger portions is affected by the sag bend portion. In some cases, the sag bend portion causes deterioration in vibration characteristics of the gimbal portion.

The specification of U.S. Pat. No. 5,748,409 A (Patent Literature 4) describes a weld portion that secure a load beam and a flexure to each other. Here, in order to reduce the thermal stress created in the formation of the weld portion, a circular slit is formed around substantially the entire circumference of the weld portion. The slit is formed in a position closer to the center of the flat load beam in the width direction. However, Patent Literature 4 does not mention sag bend portions or outrigger supports in the load beam.

An object of an embodiment of the present invention is to provide a suspension in which a weld portion is located near the root of the outrigger portion and near the sag bend portion, which can maintain a proper profile of the outrigger portion.

BRIEF SUMMARY OF THE INVENTION

According to one embodiment, a disk drive suspension comprises a load beam including a base portion and a distal end portion, and a flexure secured to the load beam by a weld portion. Between the base portion and the distal end portion, a sag bend portion is formed that bends in a thickness direction. The load beam includes a first portion on a side closer to the base portion and a second portion on a side closer to the distal end portion at a border to the sag bend portion. The flexure includes an outrigger portion extending in the longitudinal direction of the load beam.

A slit portion is formed around the weld portion of the load beam, to surround a half or more a circumference of the weld portion. An outrigger support portion is formed inside the slit portion. The outrigger support portion extends in a direction different from that of the second portion with respect to a cross-section along the longitudinal direction of the load beam in the thickness direction.

According to this embodiment, the profile of the outrigger portion can be properly maintained in a suspension whose weld portions are located near the root of the outrigger portion and near the sag bend portion, respectively.

One example of the slit portion may be U-shaped in a plan view of the load beam. The slit portion includes an arc-shaped slit formed a half or more a circumference of the weld portion and a pair of extension slits connected to respective ends of the arc-shaped slit. The weld portion may include a surface nugget that is exposed from a surface of the flexure. In the weld portion with the surface nugget, the distance from the center of the weld portion to the slit portion may be one or more but three times or less the diameter of the surface nugget.

The load beam may include, in its side, a flange bend portion along the longitudinal direction of the load beam. Between the flange bending portion and the slit portion, a narrow portion may be provided. The narrow portion is a part of the load beam and extends along the longitudinal direction of the load beam along the flange bending portion.

In the load beam in which the arc-shaped slit is formed in the second portion, the extension slit may extend across the sag bend portion to the first portion.

In a cross-section of the load beam along the longitudinal direction, the angle of the outrigger support portion may be less than the angle of the second portion with respect to a virtual line segment extending the first portion along the longitudinal direction. In the load beam in which the arc-shaped slit is formed in the first portion, the extension slit may extend across the sag bend portion to the second portion.

According to another embodiment, the slit portion may include a first slit formed in the first portion and a second slit formed in the second portion. The first slit and the second slit may be symmetrical to each other with respect to the sag bend portion as a border. According to still another embodiment, the slit portion is formed in the first portion and the extension slit extends in the width direction of the load beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A disk drive suspension (to be referred to as suspension 10 hereinafter) according to the first embodiment will be described with reference to FIGS. 1 to 11.

Figure 1:
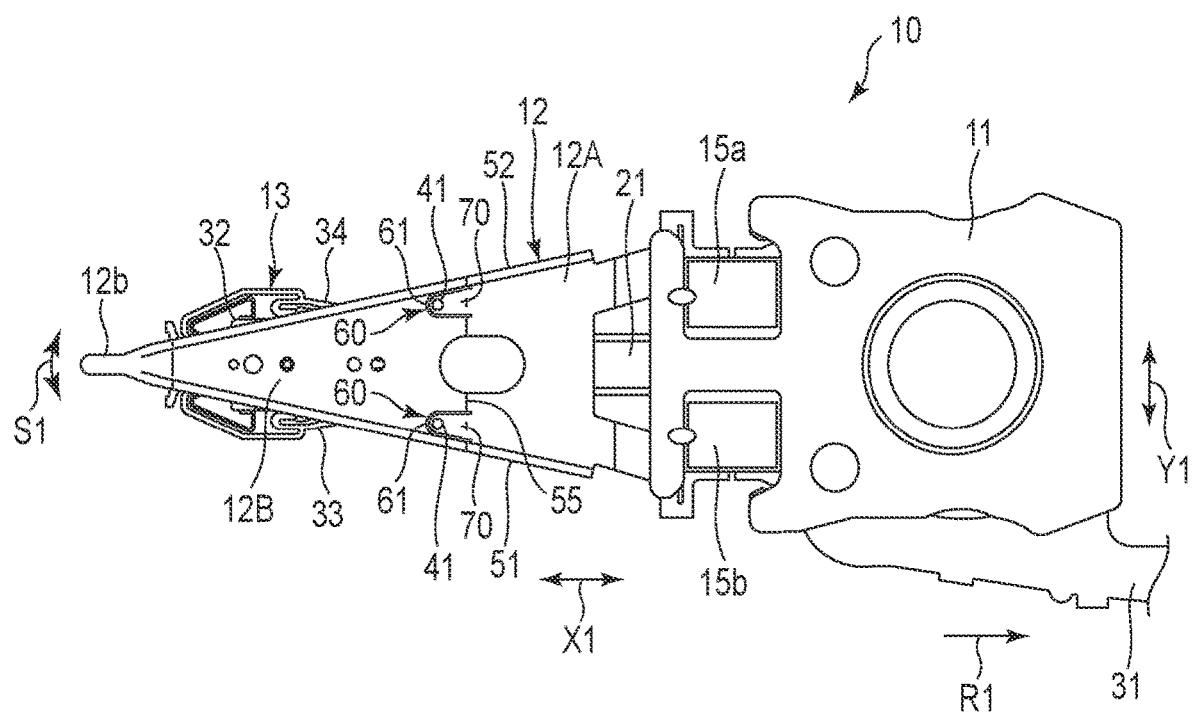
FIG. 1 is a plan view of showing a disk drive suspension according to the first embodiment, as viewed from a side of a load beam.
Figure 2:
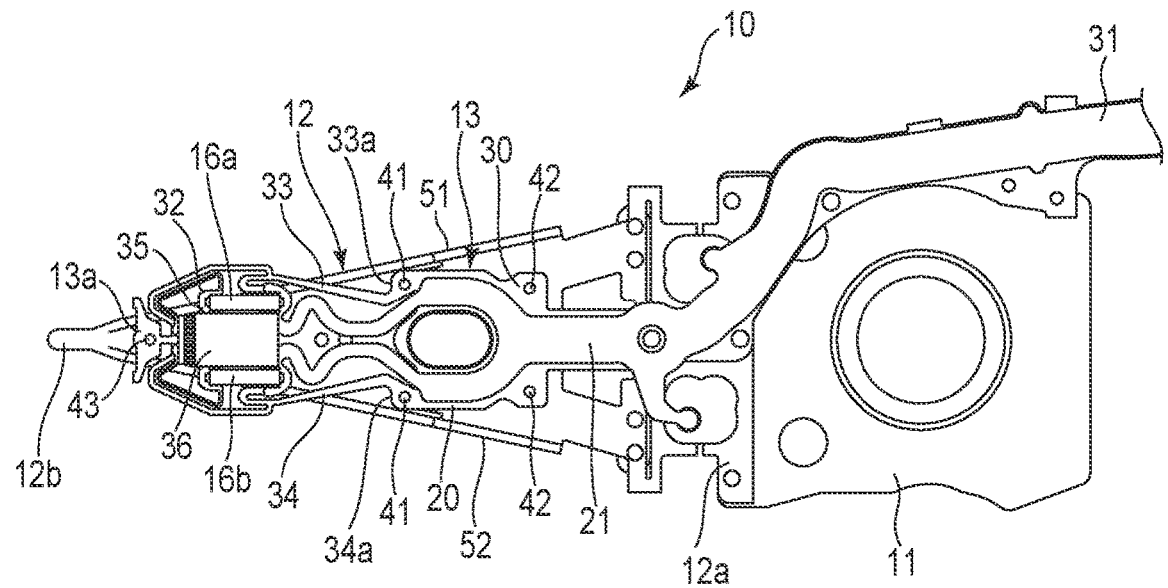
FIG. 2 is a plan view of the suspension shown in FIG. 1, as viewed from a side of a flexure.

The suspension 10 shown in FIG. 1 includes a base plate 11, a load beam 12, a flexure 13 and the like. FIG. 1 is a plan view of the suspension 10 as viewed from a side of the load beam 12. FIG. 2 is a plan view of the suspension 10 as viewed from a side of the flexure 13.

The load beam 12 is made from a stainless steel plate and extends along a longitudinal direction of the suspension 10. The direction indicated by a two-way arrow X1 in FIG. 1 is the longitudinal direction of the load beam 12. The direction indicated by a two-way arrow Y1 in FIG. 1 is the width direction of the load beam 12. The load beam 12 includes a base portion 12a (shown in FIG. 2), which is fixed to the base plate 11. The thickness of the load beam 12 is, for example, 20 to 40 µm, but may be of other thicknesses.

In the vicinity of the base portion 12a of the load beam 12, first piezoelectric elements 15a and 15b (shown in FIG. 1) are disposed. In the vicinity of a distal end portion 12b of the suspension 10, second piezoelectric elements 16a and 16b (shown in FIG. 2) are disposed. The piezoelectric elements 15a, 15b, 16a and 16b have the function of moving the distal end portion 12b of the suspension 10 in a sway direction (the direction indicated by the two-way arrow S1 in FIG. 1).

The flexure 13 includes a metal base (metal plate) 20 and a wiring portion 21. The metal plate 20 is made of a thin plate of stainless steel. The wiring portion 21 is located along the metal plate 20. The thickness of the metal plate 20 is, for example, 20 µm (12 to 25 µm), but may be any other thickness. The thickness of the metal plate 20 is less than the thickness of the load beam 12.

As shown in FIG. 2, the flexure 13 includes a flexure main body 30, a flexure tail 31, a gimbal portion 32, and a pair of outrigger portions 33 and 34. The flexure main body 30 is fixed to the load beam 12. The flexure tail 31 extends behind the base plate 11 (in the direction indicated by R1 in FIG. 1). The gimbal portion 32 is formed near the distal end 13a of the flexure 13. On the gimbal portion 32, a tongue 35 is formed. In the tongue 35, a slider 36, which functions as a magnetic head, is disposed.

The outrigger portions 33 and 34 are formed from parts of the metal plate 20. The outrigger portions 33 and 34 extend along the length direction of the flexure 13 from both side portions of the flexure main body 30 to respective both side portions of the gimbal portion 32. The length direction of the flexure 13 is the length direction of the load beam 12 as well. The outrigger portions 33 and 34 each have an elongated slim shape and elastically support the tongue 35 and the like. The roots 33a and 34a of the outrigger portions 33 and 34 are connected to the flexure main body 30.

The metal plate 20 of the flexure 13 is secured to the load beam 12 by a plurality of weld portions 41, 42 and 43. The weld portions 41, 42 and 43 are formed by laser spot welding. The first weld portion 41 is formed near the roots 33a and 34a of the outrigger portions 33 and 34. The second weld portion 42 secures the flexure main body 30 to the load beam 12. The third weld portion 43 secures the distal end 13a of the flexure 13 to the load beam 12.

Figure 3:
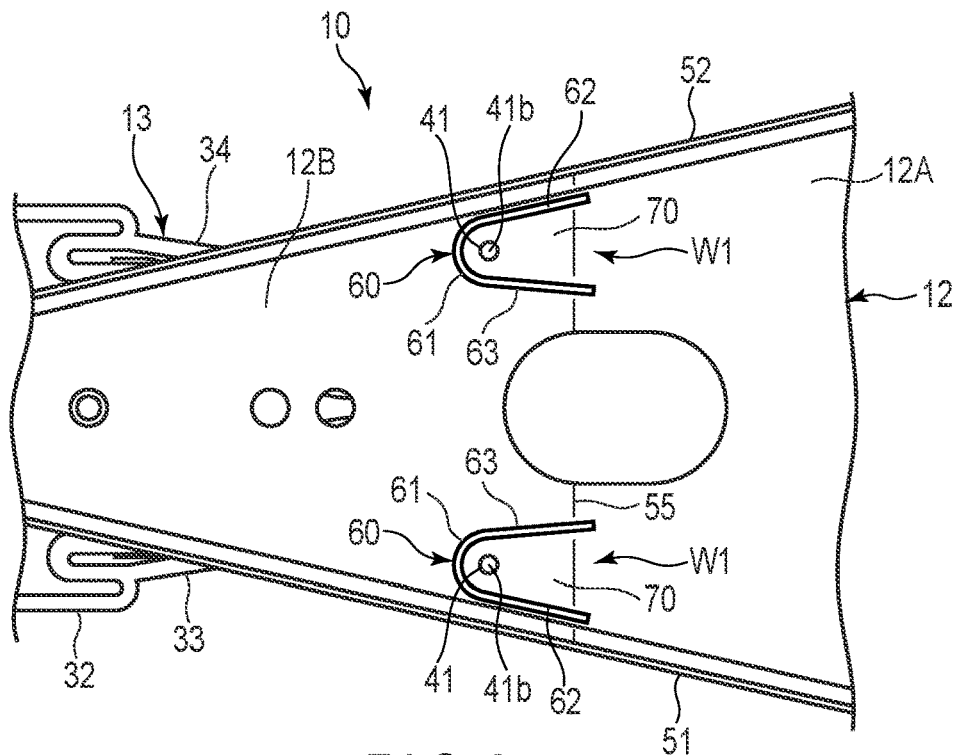
FIG. 3 is an enlarged plan view of a part of the suspension shown in FIG. 1.
Figure 4:
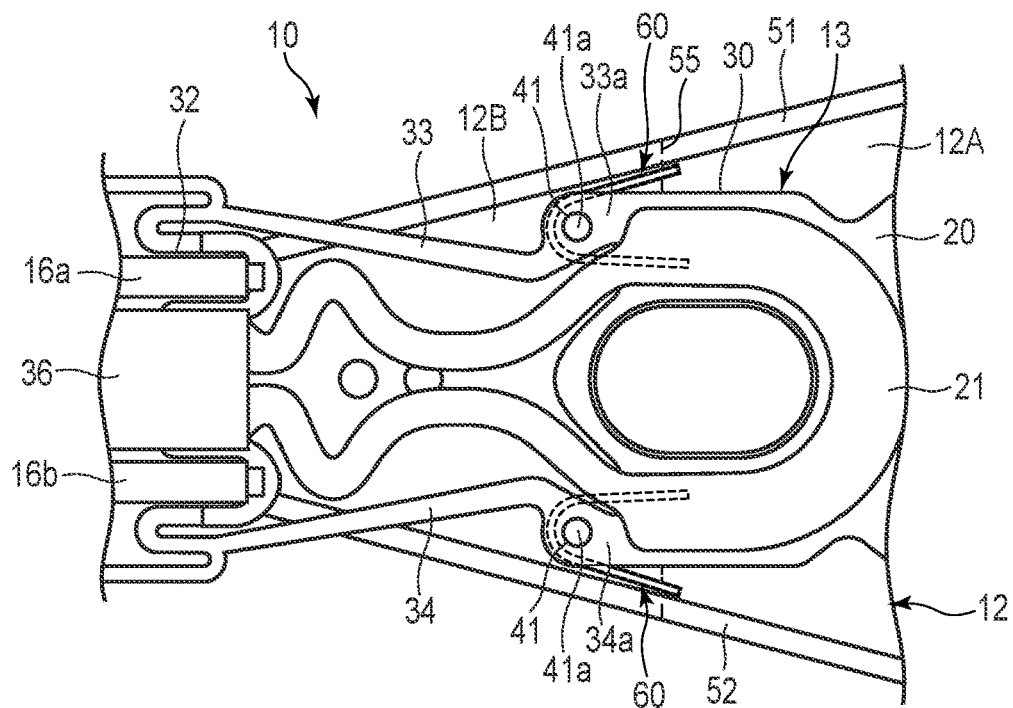
FIG. 4 is an enlarged plan view of a part of the suspension shown in FIG. 2.
Figure 5:
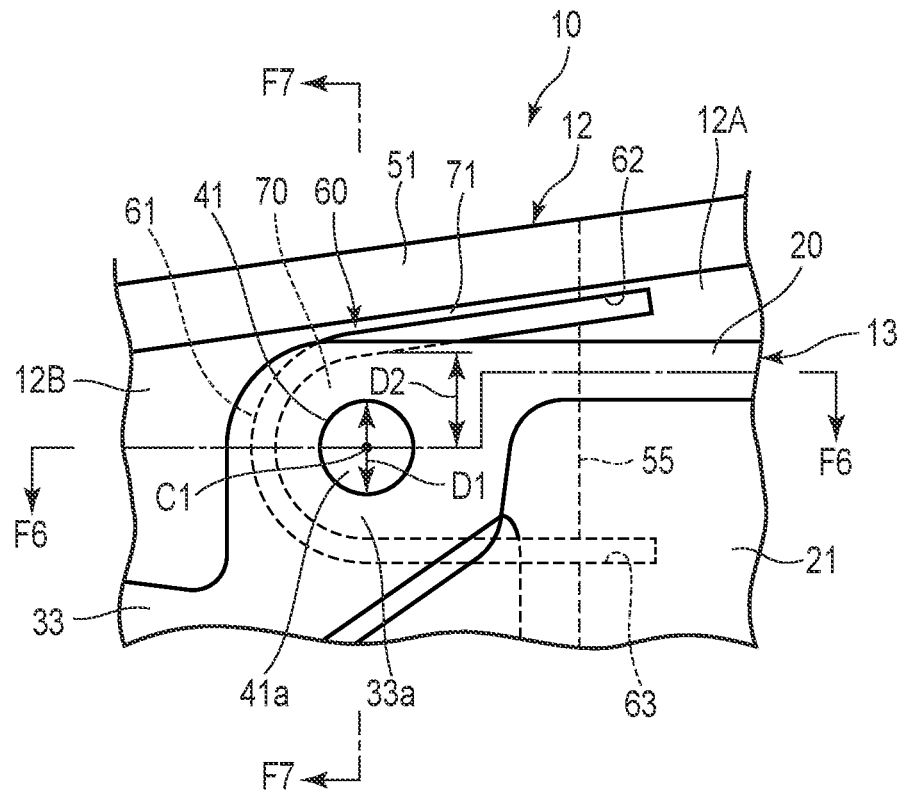
FIG. 5 is an enlarged plan view of an outrigger portion, a weld portion and the like of the suspension shown in FIG. 4.

FIG. 3 is an enlarged plan view of a part of the suspension 10 shown in FIG. 1. FIG. 4 is an enlarged plan view of a part of the suspension 10 shown in FIG. 2. FIG. 5 is an enlarged plan view of the root 33a and the weld portion 41 of one outrigger portion 33, and the like. The root 33a of the outrigger portion 33 is supported by the weld portion 41.

Figure 6:
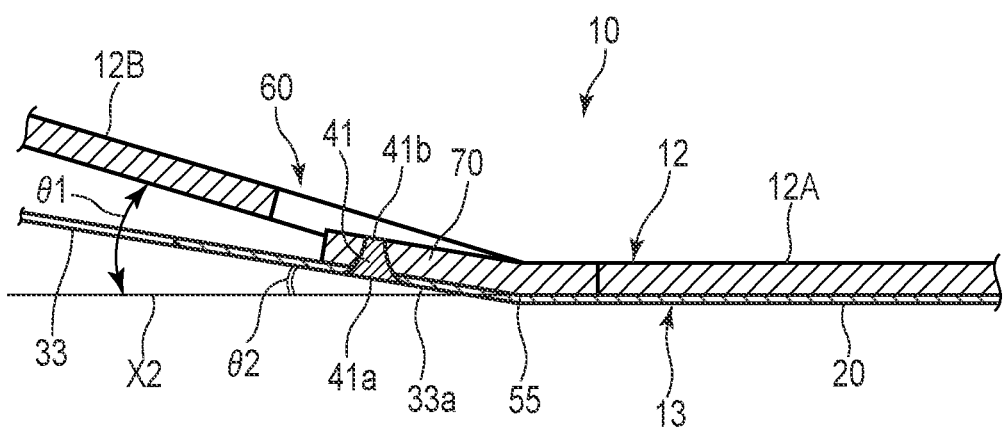
FIG. 6 is a cross-sectional view showing a part of the suspension taken along line F6-F6 in FIG. 5.
Figure 7:
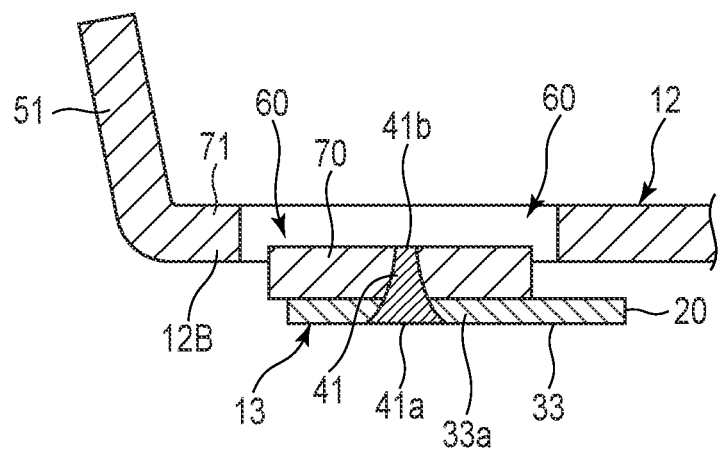
FIG. 7 is a cross-sectional view showing a part of the suspension taken along line F7-F7 in FIG. 5.

FIG. 6 is a cross-sectional view of a part of the suspension 10 (near the weld portion 41) taken along line F6-F6 in FIG. 5. FIG. 6 shows a cross-section along the longitudinal direction of the load beam 12 in the thickness direction. FIG. 7 shows a cross-sectional view of a part near the weld portion 41 taken along line F7-F7 in FIG. 5. FIG. 7 shows a cross section along the width direction of the load beam 12.

FIGS. 6 and 7 show the root 33a and the weld portion 41 of one (outrigger portion 33) of the pair of outrigger portions 33 and 34. The root 34a and the weld portion 41 of the other outrigger portion 34 are configured to be similar to those of the root 33a and the weld portion 41 of the outrigger portion 33. For this reason, the outrigger portion 33 and the weld portion 41 will be described as representative hereafter.

Figure 8:
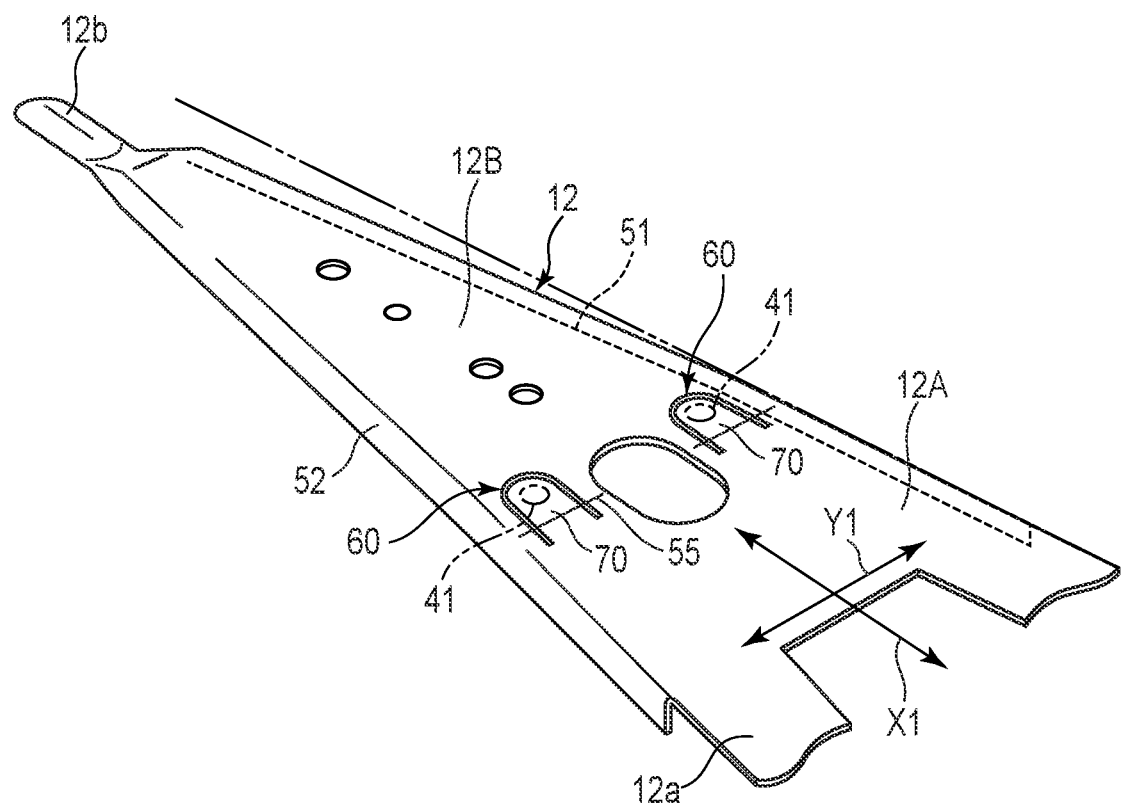
FIG. 8 is a perspective view showing the load beam of the suspension shown in FIG. 1.

FIG. 8 is a perspective view of the load beam 12. On respective sides of the load beam 12, flange bend portions 51 and 52 are formed. The flange bend portions 51 and 52 extend in the longitudinal direction of the load beam 12. The direction indicated by the two-way arrow X1 in FIG. 8 is the longitudinal direction of the load beam 12. The direction indicated by the two-way arrow Y1 in FIG. 8 is the width direction of the load beam 12.

In a longitudinal part of the load beam 12 (between the base portion 12a and the distal end portion 12b), a sag bend portion 55 is formed. As shown in FIG. 6, the sag bend portion 55 is formed by bending the longitudinal part of the load beam 12 at an angle θ1 in the thickness direction. As shown in FIG. 8, the sag bend portion 55 extends in the width direction of the load beam 12.

The load beam 12 with the sag bend portion 55 includes a first portion 12A and a second portion 12B bounded by the sag bend portion 55. The first portion 12A is located closer to the base portion 12a with respect to the sag bend portion 55. The second portion 12B is located closer to the distal end portion 12b with respect to the sag bend portion 55. The weld portion 41 is formed on the second portion 12B of the load beam 12 in the vicinity of the sag bend portion 55. The root 33a of the outrigger portion 33 is secured to the load beam 12 by the weld portion 41. The weld portion 41 supports the root 33a of the outrigger portion 33 to the load beam 12.

In the load beam 12, a slit portion 60 is formed. The slit portion 60 has a U-shaped in a plan view of the load beam 12. The slit portion 60 is formed in a region W1 (shown in FIG. 3) that includes the weld portion 41 in the plan view of the load beam 12. The region W1 including the weld portion 41 is a part of the load beam 12 and includes the root 33a of the outrigger portion 33, the weld portion 41, and a part of the sag bend portion 55.

The slit portion 60 includes an arc-shaped slit 61 and a pair of extension slits 62 and 63. The arc-shaped slit 61 is formed into such a shape as to surround approximately a half of a circumference of the weld portion 41. The extension slits 62 and 63 are connected to respective ends of the arc-shaped slit 61. Inside the slit portion 60, an outrigger support portion 70 is formed. In the outrigger support portion 70, a weld portion 41 is formed.

The arc-shaped slit 61 is formed in the second portion 12B of the load beam 12. The arc-shaped slit 61 of this embodiment is formed into an approximately semicircular shape around the weld portion 41. The extension slits 62 and 63 extend from respective ends of the arc-shaped slit 61 in a direction away from the weld portion 41. The extension slits 62 and 63 are formed along the longitudinal direction of the load beam 12. The extension slits 62 and 63 extend from the second portion 12B across the sag bend portion 55 to the first portion 12A.

Between the flange bend portion 51 and the slit portion 60, a narrow portion 71 is formed. The narrow portion 71 is a part of the load beam 12. The narrow portion 71 extends along the flange bend portion 51 and in the longitudinal direction of the load beam 12. The slit portion 60 is formed in the load beam 12. With this structure, the bending rigidity of the load beam 12 becomes lower in the vicinity of the slit portion 60. However, since the flange bend portion 51 is provided near the narrow portion 71, a necessary rigidity as the load beam 12 is obtained.

The weld portion 41 is formed by irradiating a laser beam by a laser irradiation device from the side of the flexure 13 of the suspension. The region where the laser beam is focused is fused, and as the fused metal solidifies, the weld portion 41 is formed. The weld portion 41 has a front nugget 41a and a rear nugget 41b. The front nugget 41a is exposed from the surface of the flexure 13 and has substantially a round shape. The rear nugget 41b is exposed from the rear surface of the load beam 12 and has substantially a round shape. In other embodiments, the laser beam may be irradiated from the side of the load beam 12 of the suspension.

The front nugget 41a has a diameter D1 (shown in FIG. 5), which is greater than a diameter of the rear nugget 41b (shown in FIG. 6). The diameter D1 of the front nugget 41a is, for example, 0.13 to 0.16 mm. When forming the weld portion 41, a holding jig is used to support the load beam 12. Reference symbol D2 in FIG. 5 represents the distance from the center C1 of the weld portion 41 to the slit portion 60. If this distance D2 is excessively short, it becomes difficult to secure the contact surface of the holding jig mentioned above.

On the other hand, if the distance D2 is excessively large, it is undesirable because part of the slit portion 60 may reach the flange bend portion 51. As the distance D2 is larger, the area of the outrigger support portion 70 becomes larger, and therefore the rigidity of the outrigger support portion 70 becomes excessive. For such a reason, the distance D2 from the center C1 of the weld portion 41 to the slit portion 60 should preferably be at least one and not more than three times the diameter D1 of the front nugget 41a.

FIG. 6 shows a cross-sectional view along the longitudinal direction of the load beam 12. As shown in FIG. 6, viewing the load beam 12 from a side, the second portion 12B is bent in the thickness direction of the load beam 12 with respect to the first portion 12A. That is, the second portion 12B is bent at an angle θ1 in the thickness direction of the load beam 12, at the boundary of the sag bend portion 55. In contrast, the outrigger support portion 70 is bent at an angle θ2 on the same side as the second portion 12B of the load beam 12.

As shown in FIG. 6, the outrigger support portion 70 extends in a direction different from that of the second portion 12B of the load beam 12. In FIG. 6, let us suppose X2 as a virtual line segment extending the first portion 12A in the longitudinal direction of the load beam 12. The angle that the outrigger support portion 70 makes with respect to this virtual line segment X2 is θ2. The angle of the second portion 12B to the virtual line segment X2 is θ1. The angle θ2 of the outrigger support portion 70 is smaller than the angle θ1 of the second portion 12B.

The root 33a of the outrigger portion 33 is fixed to the outrigger support portion 70 by the weld portion 41. Therefore, the root 33a of the outrigger portion 33 is bent at an angle θ2, which corresponds to that of the outrigger support portion 70. As shown in FIG. 7, the outrigger support portion 70 is set to have different heights along the thickness direction with respect to the load beam 12.

Figure 9:
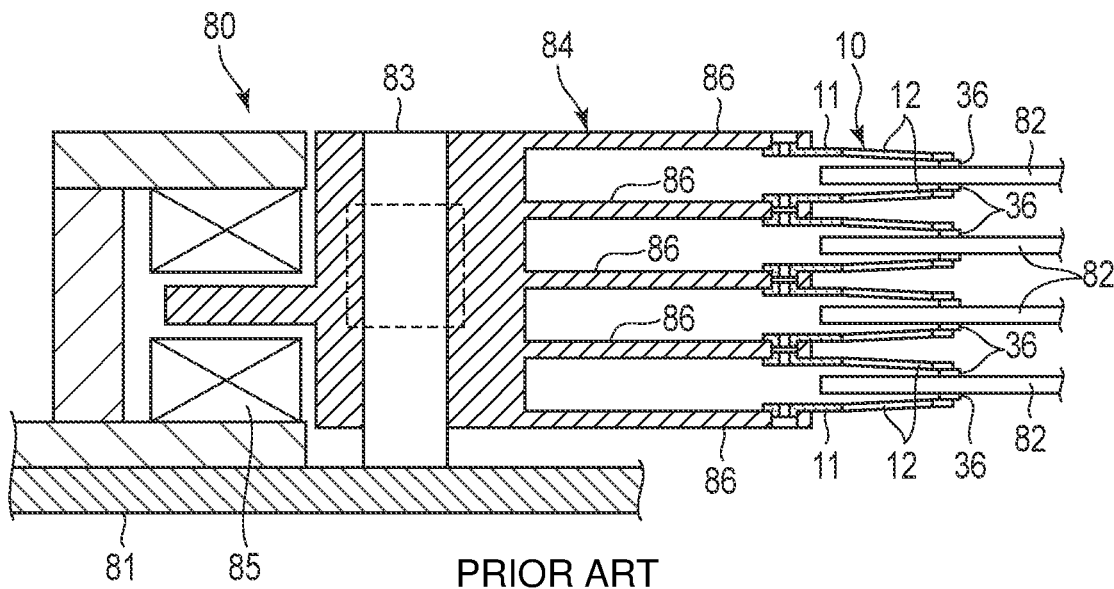
FIG. 9 is a cross-sectional view showing an example of a disk drive.

FIG. 9 is a cross-sectional view schematically showing an example of a disk drive 80. The disk drive 80 has a case 81 (only a part thereof is shown), disks 82, a carriage 84, a positioning motor 85 and the like. The disks 82 rotate around a spindle. The carriage 84 pivots around a pivot axis 83. The motor 85 drives the carriage 84. The case 81 is sealed by a lid. The carriage 84 includes a plurality of arm portions 86. The base plate 11 of the suspension 10 is fixed to the distal end of each of the arm portions 86.

When a disk 82 rotates, an air bearing is formed between the slider 36 and the disk 82. When the carriage 84 is pivoted by the motor 85, the suspension 10 moves along the radial direction of disk 82. Thus, the slider 36 is moved to a desired position on the disk 82.

Figure 10:
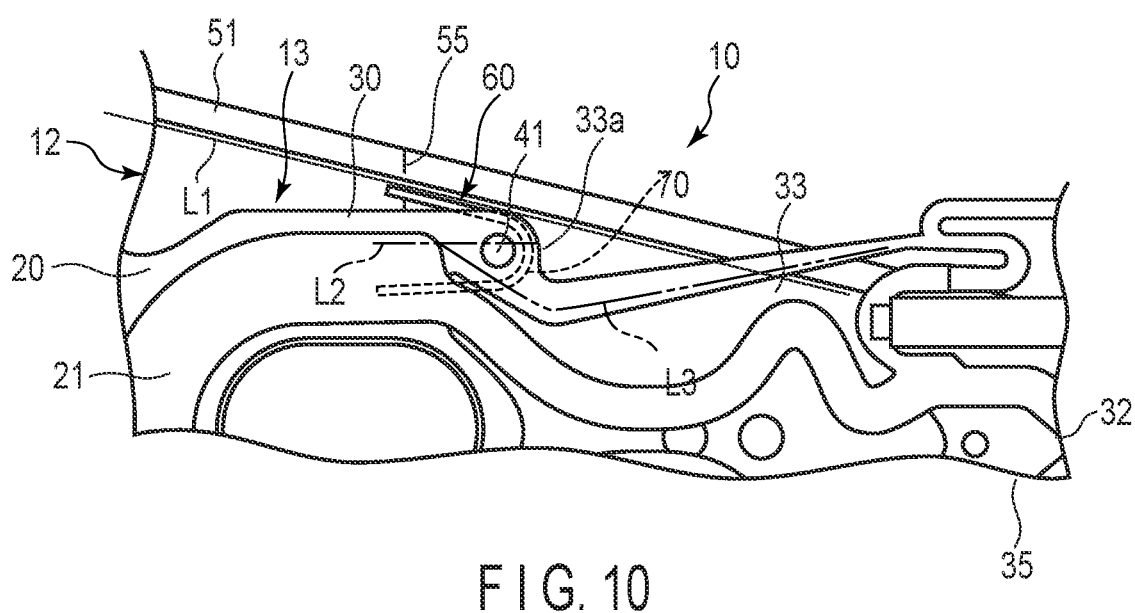
FIG. 10 is a plan view of a part of the suspension shown in FIG. 4 with the left and right sides reversed.
Figure 11:
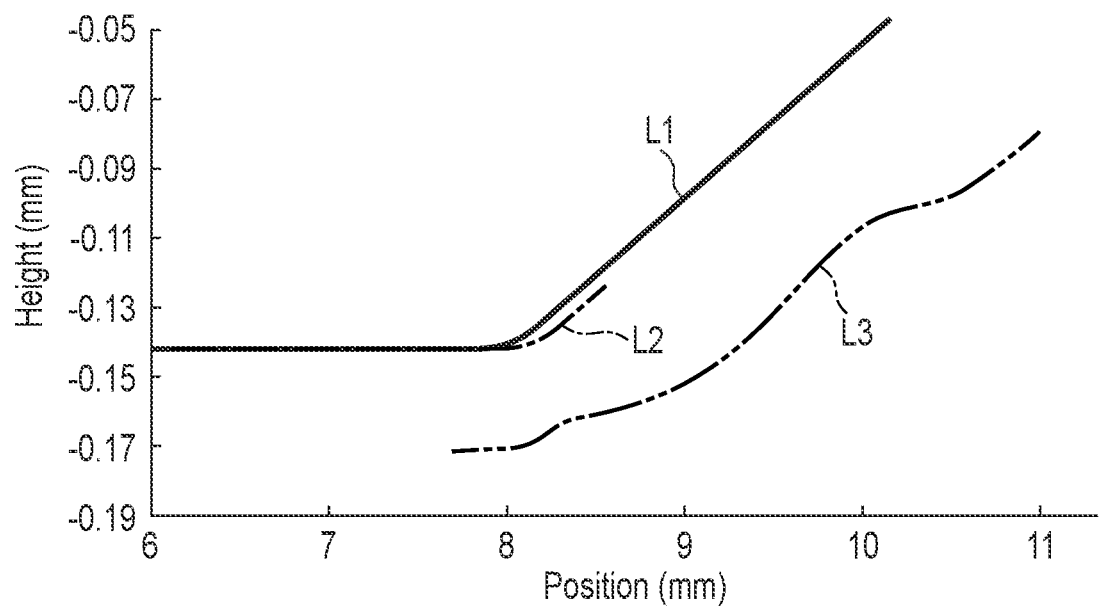
FIG. 11 is a diagram showing the relationship between a position and a height along line segments L1, L2 and L3 shown in FIG. 10.

FIG. 10 is an enlarged plan view of a part of the suspension 10. The suspension 10 includes an outrigger portion 33. For convenience of explanation, FIG. 10 is represented in left-to-right reverse as compared to FIG. 4. FIG. 11 shows the relationship between position along line segments L1, L2 and L3 shown in FIG. 10 and height. As indicated by the line segment L3 in FIG. 11, the profile of the outrigger portion 33 is optimized according to the angle θ2 (shown in FIG. 6) of the outrigger support portion 70.

Second Embodiment

Figure 12:
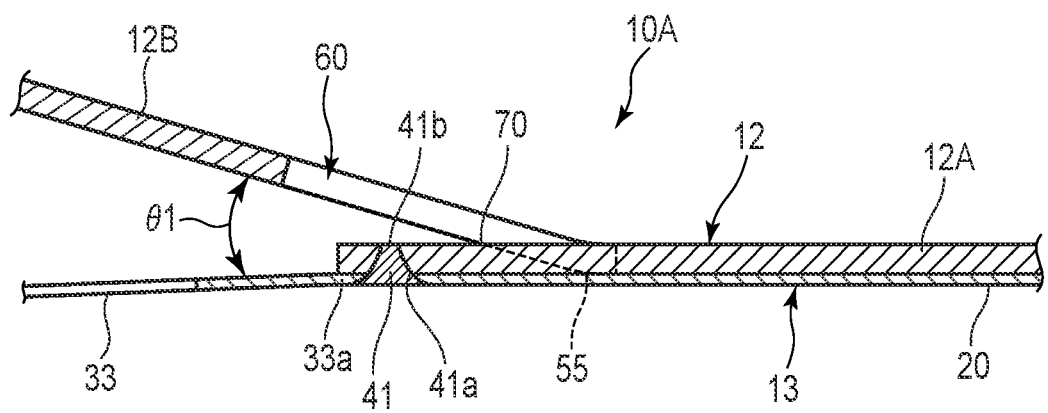
FIG. 12 is a cross-sectional view showing a root of an outrigger portion, a weld portion and the like of the suspension according to the second embodiment.

FIG. 12 shows a cross-sectional view of the vicinity of an outrigger support portion 70 of a suspension 10A according to the second embodiment. The outrigger support portion 70 of the suspension 10A extends in the same direction as that of the first portion 12A with regard to a cross-section taken along the longitudinal direction of the load beam 12. The outrigger support portion 70 extends in a direction different from that of the second portion 12B of the load beam 12. The outrigger support portion 70 and the second portion 12B make an angle θ1 with respect to each other.

Figure 13:
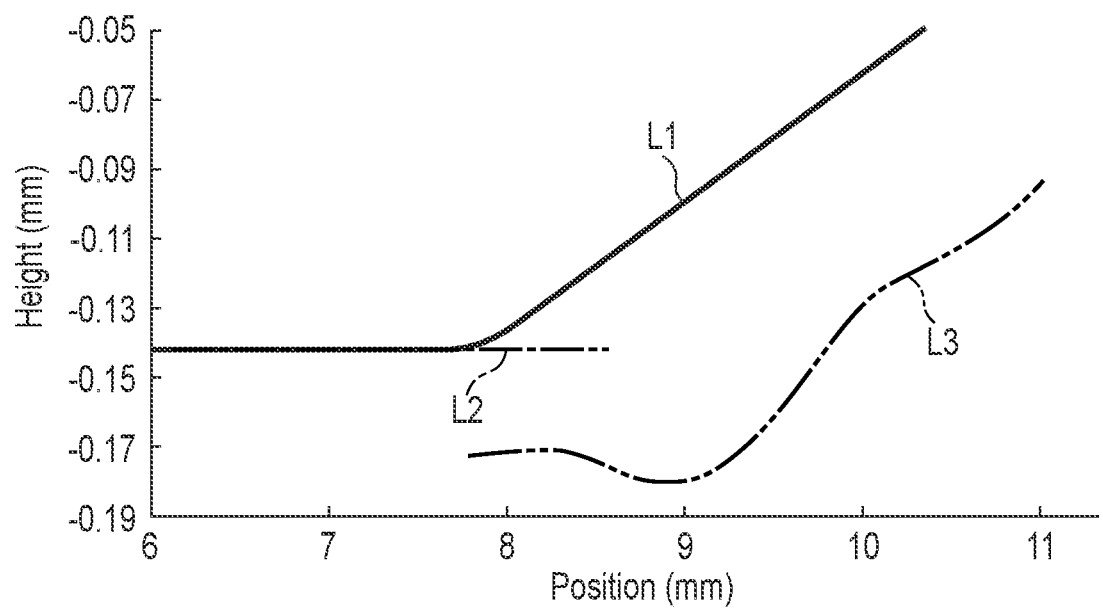
FIG. 13 is a diagram showing the relationship between a position and a height along line segments L1, L2 and L3 shown in FIG. 10 in the suspension shown in FIG. 12.

FIG. 13 shows the relationship between the positions respectively corresponding to line segments L1, L2 and L3 shown in FIG. 10 and the heights. The line segment L3 shown in FIG. 13 represents a profile of the outrigger portion 33 of the suspension 10A in the second embodiment (shown in FIG. 12). The outrigger portion 33 of the suspension 10A has a profile according to the outrigger support portion 70. In this embodiment, the heights of the locations respectively corresponding to the line segments L1 and L2 are measured with reference to the rear surface of the load beam 12. In FIG. 13, the heights correspond to the direction of the locations measured. As to the other structure and operation, since the suspension 10A of the second embodiment shares the same configuration with the suspension 10 of the first embodiment (shown in FIGS. 1 to 8), the items common to both are designated by the same reference symbols and the explanation thereof is omitted.

Third Embodiment

Figure 14:
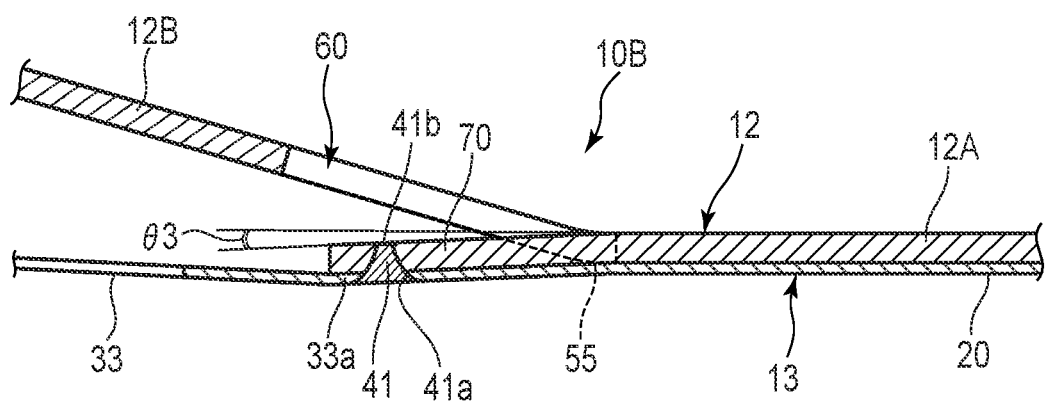
FIG. 14 is a cross-sectional view showing a root of an outrigger portion, a weld portion and the like of a suspension according to the third embodiment.

FIG. 14 shows a cross-sectional view of the vicinity of an outrigger support portion 70 of a suspension 10B according to the third embodiment. FIG. 14 is a cross-section taken along the longitudinal direction of a load beam 12. The outrigger support portion 70 of the suspension 10B is bent at a negative angle θ3 to an opposite side of a second portion 12B. The outrigger portion 33 of the suspension 10B has a profile according to the outrigger support portion 70 having a negative angle θ3. As to the other structure and operation, since the suspension 10B of the third embodiment shares the same configuration with the suspension 10 of the first embodiment, the items common to both are designated by the same reference symbols and the explanation thereof is omitted.

Fourth Embodiment

Figure 15:
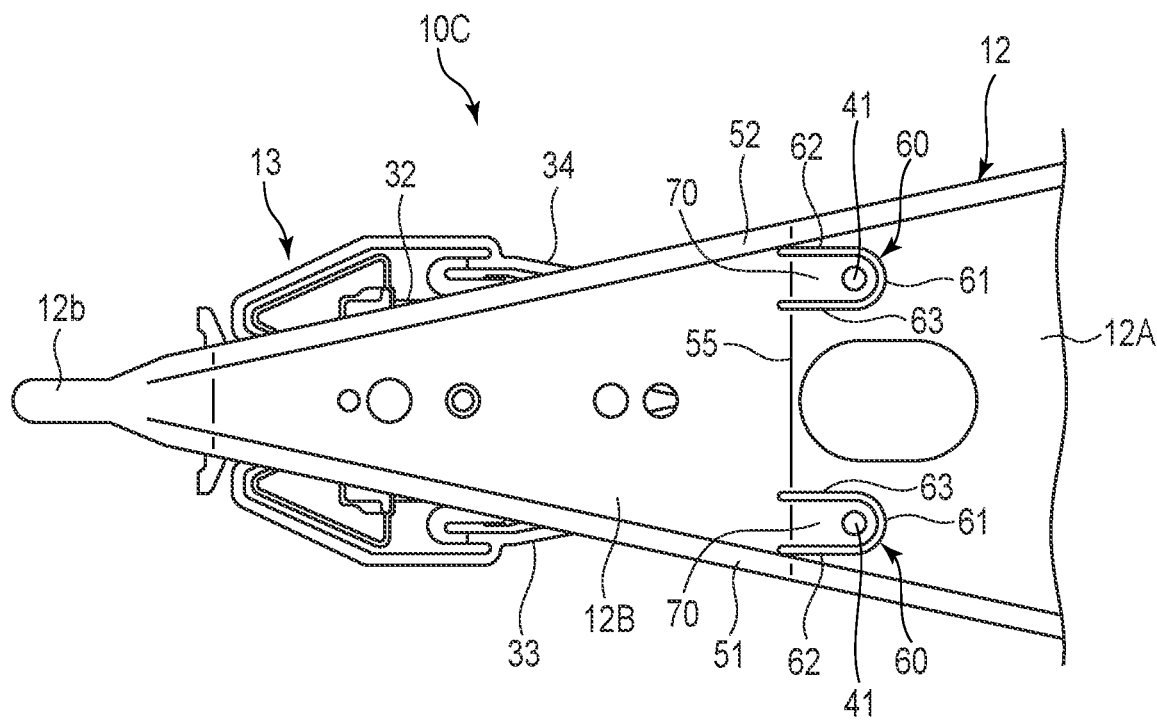
FIG. 15 is a plan view showing a part of a suspension according to the fourth embodiment.

FIG. 15 is a plan view of a suspension 10C according to the fourth embodiment. An arc-shaped slit 61 of this suspension 10C is formed in a first portion 12A of the load beam 12. Extension slits 62 and 63 extend from the first portion 12A across the sag bend portion 55 to the second portion 12B. As to the other structure and operation, since the suspension 10C of the fourth embodiment shares the same configuration with the suspension 10 of the first embodiment, the items common to both are designated by the same reference symbols and the explanation thereof is omitted.

Fifth Embodiment

Figure 16:
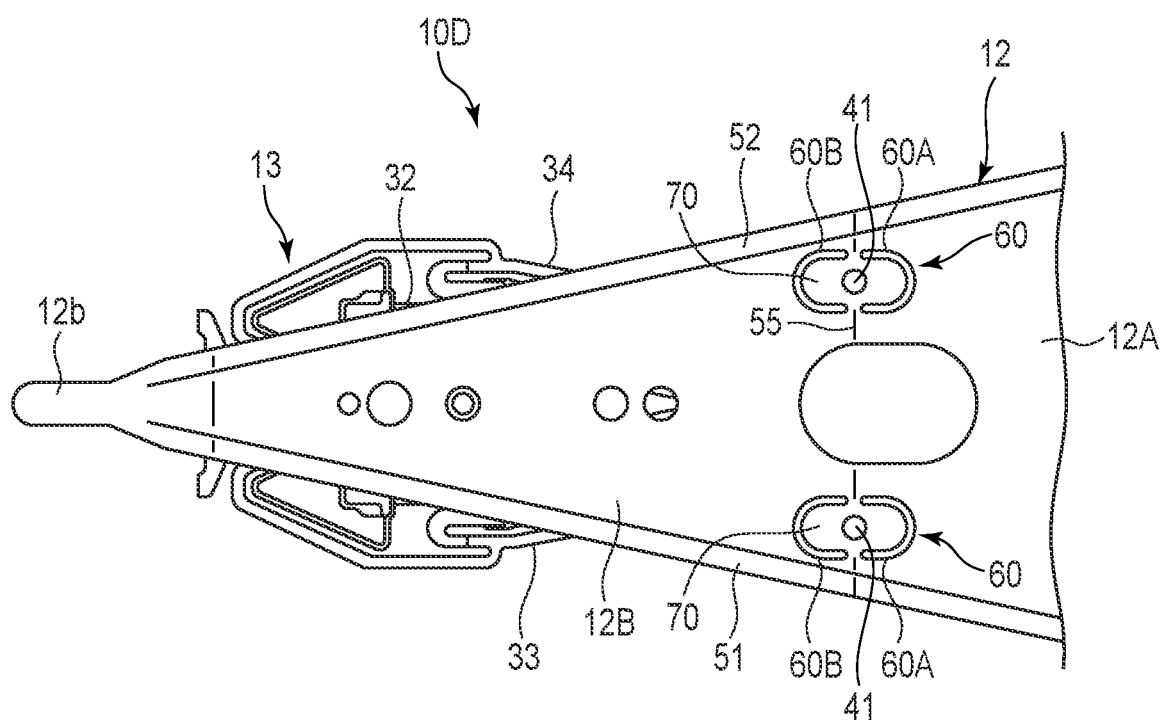
FIG. 16 is a plan view showing a part of a suspension according to the fifth embodiment.

FIG. 16 is a plan view of a suspension 10D according the fifth embodiment. A slit portion 60 of this suspension 10D includes a first slit 60A and a second slit 60B. The first slit 60A and the second slit 60B are symmetrical to each other with respect to a sag bend portion 55 as the axis of symmetry. The first slit 60A is formed in the first portion 12A of the load beam 12. The second slit 60B is formed in the second portion 12B of the load beam 12.

The slit portion 60 includes the first slit 60A and the second slit 60B. An outrigger support portion 70 with a weld portion 41 is formed inside the slit portion 60. Note that the first slit 60A and the second slit 60B need not be completely symmetrical. For example, the first slit 60A and the second slit 60B may be slightly asymmetrical with respect to the sag bend portion 55 as a border. As to the other structure and operation, since the suspension 10D of the fifth embodiment shares the same configuration with the suspension 10 of the first embodiment, the items common to both are designated by the same reference symbols and the explanation thereof is omitted.

Sixth Embodiment

Figure 17:
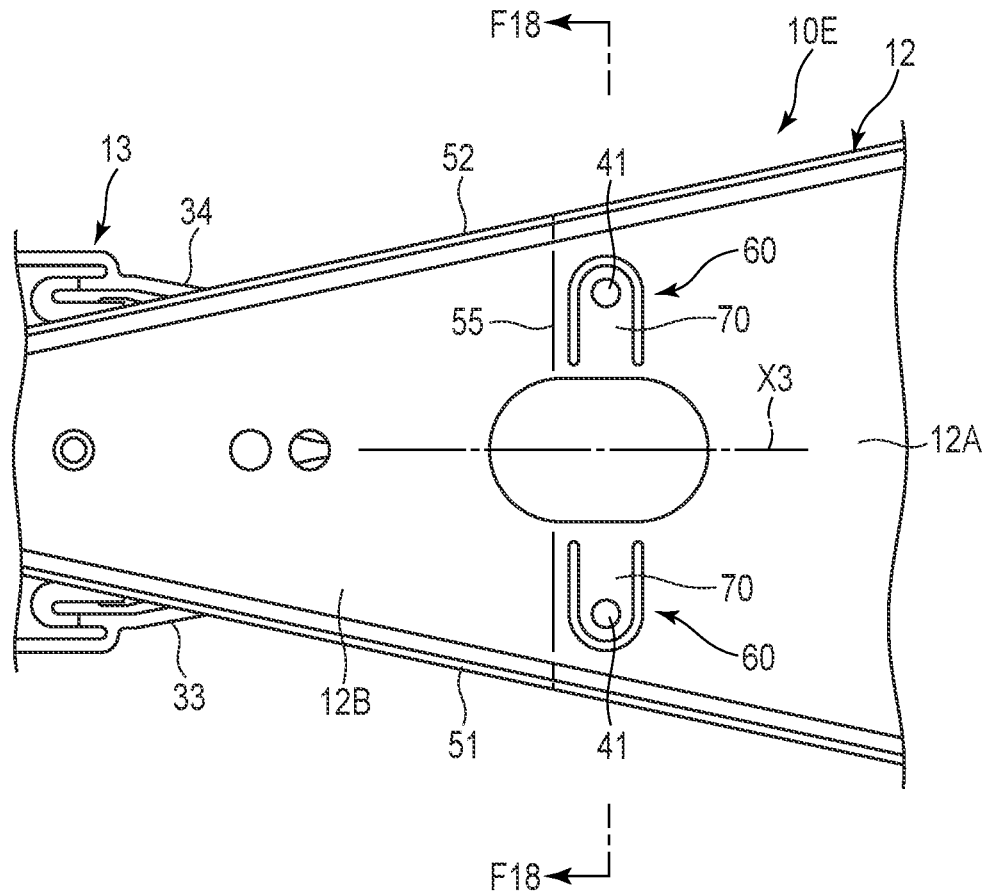
FIG. 17 is a plan view showing a part of a suspension according to the sixth embodiment.
Figure 18:
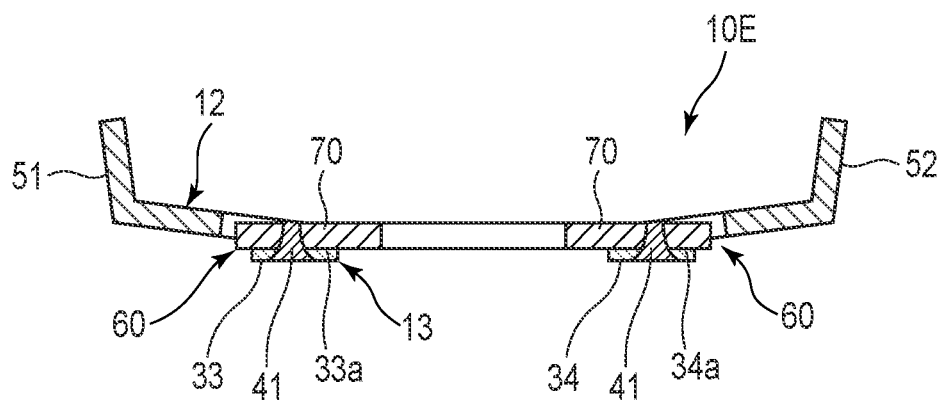
FIG. 18 is a cross-sectional view of the suspension taken along line F18-F18 in FIG. 17.

FIG. 17 is a plan view of a suspension 10E according to the sixth embodiment. FIG. 18 is a cross-sectional view of the suspension 10E taken along line F18-F18 in FIG. 17. In FIG. 17, an axis X3 extends along the longitudinal direction of the load beam 12. The suspension 10E includes a pair of slit portions 60 that are line symmetrical with respect to the axis X3 as the axis of symmetry. The slit portions 60 are formed in the first portion 12A of the load beam 12. The extension slits 62 and 63 extend along the width direction of the load beam 12. An outrigger support portion 70 with a weld portion 41 is formed inside the slit portions 60.

As shown in FIG. 18, a central portion of the cross-section along the width direction of the load beam 12 is slightly convex and curved to the opposite side of flange bend portions 51 and 52. A pair of outrigger support portions 70 each extend in the width direction of the load beam 12. As to the other structure and operation, since the suspension 10E of the sixth embodiment shares the same configuration with the suspension 10 of the first embodiment, the items common to both are designated by the same reference symbols and the explanation thereof is omitted.

In implementing the present invention, it goes without saying that the specific shape and configuration of the load beam and flexure that constitute the suspension, as well as the shape and arrangement of the sag bend portion, outrigger portion, slit portion, outrigger support portion, etc., can be changed as necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
    a load beam including a base portion and a distal end portion; and
    a flexure including outrigger portions extending in a longitudinal direction of the load beam and fixed to the load beam;
    a sag bend portion formed between the base portion and the distal end portion of the load beam and bent in a thickness direction of the load beam;
    a first portion on a side closer to the base portion at a border to the sag bend portion;
    a second portion on a side closer to the distal end portion at a border to the sag bend portion;
    weld portions which secure the load beam and the flexure to each other and support roots of the outrigger portions;
    slit portions formed around the weld portions, respectively, such that each slit portion surrounds at least half of a circumference of the corresponding weld portion; and
    outrigger support portions located inside the slit portions and extending in a direction different from that of the second portion in a cross-section along the longitudinal direction in the thickness direction of the load beam.

2. The disk drive suspension of claim 1, wherein each of the slit portions comprises:
    an arc-shaped slit formed around a half or more of a circumference of the corresponding weld portion; and
    a pair of extension slits connected to respective ends of the arc-shaped slit and extending in a direction away from the corresponding weld portion, and
    wherein the slit portions are formed into a U-shape in a plan view of the load beam.

3. The disk drive suspension of claim 1, wherein each of the weld portions comprises a front nugget exposed from a surface of the flexure,
    wherein a distance from a center of each of the weld portions to the corresponding slit portion is at least one or more but three times or less a diameter of the front nugget.

4. The disk drive suspension of claim 1, further comprising:
    flange bend portions on a side of the load beam along the longitudinal direction of the load beam; and
    narrow portions between the flange bend portions and the slit portions, respectively, which are a part of the load beam and extend along the flange bend portions in the longitudinal direction of the load beam.

5. The disk drive suspension of claim 2, further comprising:
    flange bend portions on a side of the load beam along the longitudinal direction of the load beam; and
    narrow portions between the flange bend portions and the slit portions, respectively, which are a part of the load beam and extend along the flange bend portions in the longitudinal direction of the load beam.

6. The disk drive suspension of claim 2, wherein, in each of the slit portions:
    the arc-shaped slit is formed in the second portion of the load beam, and
    the extension slits extend across the sag bend portion to the first portion.

7. The disk drive suspension of claim 6, wherein, in the cross-section of the load beam along the longitudinal direction, an angle of the outrigger support portions is less than an angle of the second portion with respect to a virtual line segment extending from the first along the longitudinal direction.

8. The disk drive suspension of claim 2, wherein, in each of the slit portions:
    the arc-shaped slit is formed in the first portion of the load beam, and
    the extension slits extend across the sag bend portion to the second portion.

9. The disk drive suspension of claim 1, wherein each of the slit portions includes:
    a first slit formed in the first portion; and
    a second slit formed in the second portion, and
    wherein the first slit and the second slit are symmetrical with respect to each other at a border of the sag bend portion.

10. The disk drive suspension of claim 2, wherein, in each of the slit portions:
    the slit portion is formed in the first portion of the load beam, and the extension slits extend along a width direction of the load beam.

\* \* \* \* \*